Patented Aug. 7, 1951

2,563,381

UNITED STATES PATENT OFFICE 2,563,381

AZO DYEING PROCESS

Charles H. Stratton, Phillipsburg, N. J., assignor to General Aniline & Film Corporation, New York, N. Y., a corporation of Delaware No Drawing. Application December 30, 1947, Serial No. 794,777

5 Claims. (Cl. 8—46)

This invention relates to a process for dyeing cellulosic fiber, involving formation of an insoluble azo dyestuff on the fiber, and to the dyestuffs thereby produced.

In the direct dyeing of cotton and other cellulosic fibers, or textile materials containing the same, water-soluble substantive or direct dyestuffs, particularly polyazo dyestuffs such as those derived from tetrazotized diamino-diaryl compounds (e. g., benzidine and its substitution products) are commonly employed. Such dyestuffs generally contain sulfo groups or similar acidic water-solubilizing groups rendering the dyestuffs water-soluble so that they can be applied from aqueous dye baths. However, since the dyestuff on the fiber retains its water-solubilizing groups, the colorations are generally characterized by defective fastness to washing. Some improvement in wash-fastness is obtained by employing a direct or substantive dye containing a diazotizable amino group, diazotizing the dyestuff on the fiber and coupling with a relatively insoluble azo coupling component, such as $\beta$-naphthol. The increased molecular size of the dyestuff results in some improvement in fastness to washing, but since solubilizing groups are still present in the dyestuff molecule, the coloration still washes out to an appreciable extent.

A number of methods have been proposed heretofore involving coloration of cellulosic fiber with dyestuffs containing water-solubilizing groups which are split off or rendered inoperative by subsequent treatment to yield colorations of greatly improved fastness to washing by reason of the absence or reduction in number of water-solubilizing groups in the dyestuff molecule.

Thus, it has been suggested to apply a dyestuff obtained by coupling a tetrazotized benzidine compound with $\alpha$-naphthyl sulfamic acid to cotton fiber, diazotizing the dyed cotton material by treatment with dilute mineral acid and sodium nitrite, whereby the sulfamic acid radical is converted to a diazo group, and then developing in known manner, e. g., by treatment with a suitable coupling component. By employing a coupling component having no acidic water-solubilizing groups, a water-insoluble dyestuff can be formed on the fiber having excellent fastness to washing.

The foregoing process, however, is subject to the disadvantage that the direct dyeing azo compounds derived, as set out above, from $\alpha$-naphthyl sulfamic acids, require relatively drastic treatment to effect conversion of the sulfamic acid groups to diazo groups. Thus, I have found that disazo dyestuffs containing $\alpha$-naphthyl sulfamic acids as coupling components require a substantial excess of strong mineral acid (e. g., hydrochloric acid or sulfuric acid) in the nitrous acid solution employed to effect diazotization. The mineral acid has a tendency to corrode the equipment as well as to attack and weaken the fiber, thus requiring special precautions in commercial practice and limiting the field of application of this process.

I have discovered that certain polyazo compounds which are substantive toward cellulosic fibers in direct dyeing procedures, and containing terminal $\beta$-naphthyl sulfamic acid radicals can be readily diazotized on the fiber so as to convert the sulfamic acid radicals to diazo groups by treatment with diazotizing solutions in the same manner as is usual with fibers which have been dyed with ordinary direct diazo colors, i. e., by treatment of the dyed fiber with an aqueous solution of nitrous acid containing no substantial excess of mineral acid, and without any other drastic treatment. Thus, diazotization of the polyazo compounds employed in accordance with my invention can be carried out on cellulosic fiber such as cotton or regenerated cellulose rayon, without risking injury to the goods or equipment; and upon subsequent development with a suitable azo coupling component an insoluble dyestuff can be formed on the fiber having outstanding fastness to washing.

The parent polyazo compounds derived from $\beta$-naphthyl sulfamic acids which can be employed in accordance with my invention for application to cellulosic fibers by direct dyeing processes, and wherein the sulfamic acid radical can be readily diazotized in the absence of an injurious excess of strong mineral acid, have in free acid form the following general formula:

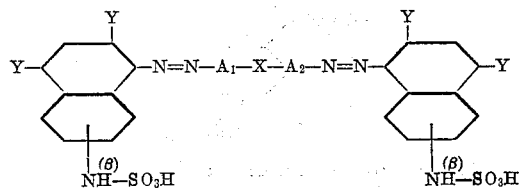

wherein $A_1$ and $A_2$ are phenylene radicals, X is a member of the class consisting of a single valence bond and an acyclic atomic bridge interconnecting the radicals $A_1$ and $A_2$, one Y of each naphthyl sulfamic acid nucleus is hydrogen and the other Y is a substituent of the class consisting of hydroxy and alkoxy groups, the sulfamic acid group occupying a beta-position in the ring of the naphthalene nucleus opposite the Y-substituted ring, said compound containing no acidic water-solubilizing groups other than the sulfamic acid groups, i. e., no groups such as $SO_3H$ or $COOH$.

The phenylene radicals $A_1$ and $A_2$ can be unsubstituted or may contain non-solubilizing nuclear substituents such as halogen, alkoxy or alkyl groups. The acyclic atomic bridge represented by X includes such radicals as,

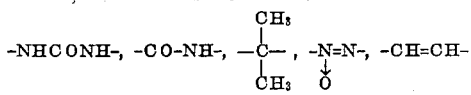

The azo groups can be attached to the A₁ and A₂ radicals in the same positions (e. g., in the para positions) or in different positions (e. g., in the para and meta positions respectively) relative to X.

Thus, the grouping —A₁—X—A₂— in the above formula may represent, for example, the following radicals:

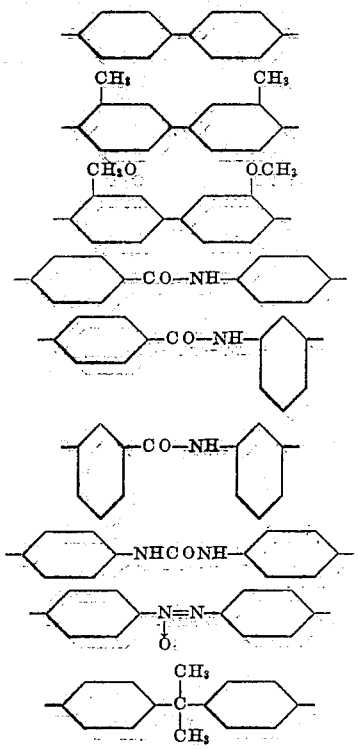

etc.

The radical,

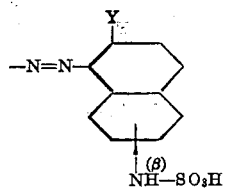

represents, for example, a 2-hydroxy-7-sulfamino-naphthyl-1-azo radical, a 4-hydroxy-7-sulfamino-naphthyl-1-azo radical, a 4-alkoxy-7-sulfamino-naphthyl-1-azo radical or a 4-hydroxy-6-sulfamino-naphthyl-1-azo radical. Of these, 2-hydroxy-7-sulfamino-naphthyl-1-azo radicals are preferred in that polyazo compounds prepared therefrom yield developed dyeings possessing the most uniform fastness to washing when combined with different —A₁—X—A₂— radicals.

The radical —A₁—X—A₂— preferably represents a p,p'-diphenyl radical, with or without nuclear substituents as aforesaid, since dyeings produced with this class of compounds in accordance with the process of this invention have been found to have especially good fastness to washing.

The polyazo compounds of the foregoing formula can be conveniently prepared by coupling a tetrazotized diamine having the formula:

in which A₁, A₂ and X have the same meaning set out above, with a 2- or 4-hydroxy-naphthyl-6- or -7-sulfamic acid in alkaline medium.

Polyazo compounds of the foregoing general formula are water-soluble by reason of the presence of the sulfamic acid radicals in the terminal naphthalene nuclei. They form stable solutions in alkaline to neutral aqueous baths at temperatures up to 100° C., and are reasonably stable in cold dilute aqueous acid solution. They possess substantivity toward cellulosic fibers, so that textile materials containing the latter can be dyed directly therewith by the usual direct dyeing methods.

In accordance with my invention, cellulosic fiber such as cotton or regenerated cellulose rayon, is dyed with a polyazo compound of the foregoing general formula in aqueous solution in accordance with the usual direct dyeing methods. The dyed fiber is treated with an aqueous solution of nitrous acid in the same manner as is usual with fiber which has been dyed with ordinary direct diazo colors, that is, containing only a slight excess of mineral acid, and prepared, for example, by adding sulfuric acid to a solution of sodium nitrite. The sulfamic acid groups in the naphthalene nuclei of the parent dyestuff are thereby readily cleaved and converted to diazo groups. The diazotized fiber is then developed with a solution of an azo coupling component containing no acidic water-solubilizing groups, e. g., β-naphthol or 1-phenyl-3-methyl-5-pyrazolone in alkaline solution, or m-toluylene diamine in acetic acid solution. A water-insoluble polyazo dyestuff is thereby formed on the fiber, characterized by outstanding fastness to washing.

The resulting dyestuffs have the following general formula:

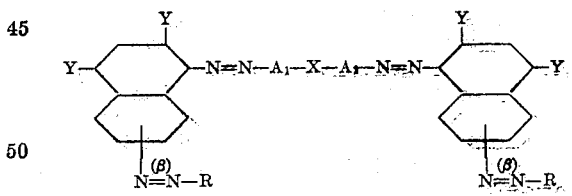

wherein R is the radical of the aforesaid azo coupling component and A₁, A₂, X and Y have the same significance as in the general formula described above, the radicals R—N=N— replacing the sulfamic acid radicals of the parent dyestuffs.

The following examples, wherein parts and percentages are by weight, illustrate the process of dyeing cellulosic materials in accordance with my invention, and a number of dyestuffs prepared by said process.

*Example 1*

Cotton cloth was dyed in the manner commonly employed for direct dyeing with an aqueous solution of a disazo dyestuff having the following formula:

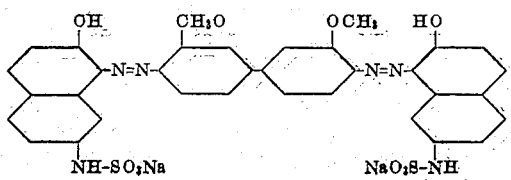

prepared, for example, by coupling 1 mol of tetrazotized o-dianisidine with 2 mols of 2-hydroxy-7-naphthyl sulfamic acid in alkaline solution. The material was thereby dyed a blue shade. 5 parts of the dyed material thus obtained was treated with an aqueous solution prepared by adding 0.25 part of concentrated sulfuric acid to a solution of 0.15 part of sodium nitrite in 200 parts of water. The sulfamic acid groups in the dyestuff on the fiber were thereby converted to diazo groups, and upon development with an aqueous alkaline bath containing 0.25 part of β-naphthol in 200 parts of water, a violet shade of unusual fastness to washing was obtained. The formula of the resulting dyestuff is as follows:

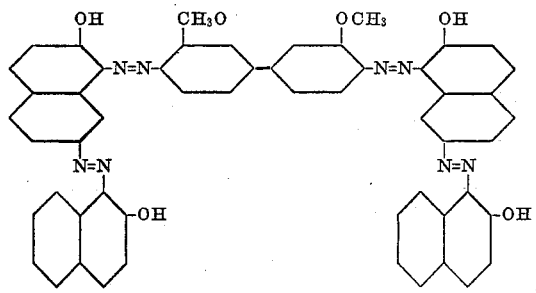

By employing, instead of the parent disazo dyestuff of this example, the corresponding disazo dyestuffs prepared by coupling 1 mol of tetrazotized dianisidine with 2 mols of 4-hydroxy-7-naphthyl sulfamic acid and 4-hydroxy-6-naphthyl sulfamic acid and applying the resulting dyestuffs to cotton cloth as described above, a blue shade was produced on the material. Upon treatment with a diazotizing solution of nitrous acid containing a slight excess of strong mineral acid, and developing with β-naphthol in aqueous alkaline solution, gray shades were produced of outstanding fastness to washing, similar to that of the dyestuff formed as described above.

*Example 2*

Cotton cloth was dyed by the usual direct dyeing procedure, employing an aqueous solution of a disazo dyestuff having the following formula:

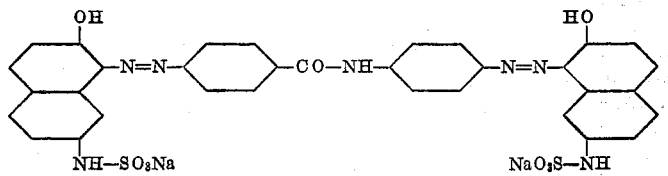

obtained by coupling 1 mol of tetrazotized N-(p'-aminobenzoyl)-p-phenylene diamine with 2 mols of 2-hydroxy-7-naphthyl sulfamic acid in alkaline solution. The cloth was dyed a bluish red shade. The dyed material was then treated with a nitrous acid solution prepared as described in Example 1, and the diazotized dyestuff developed on the fiber by coupling with β-naphthol in alkaline solution in the manner described in the first example. A brownish red shade was thereby produced having outstanding fastness to washing. The resulting dyestuff has the following formula:

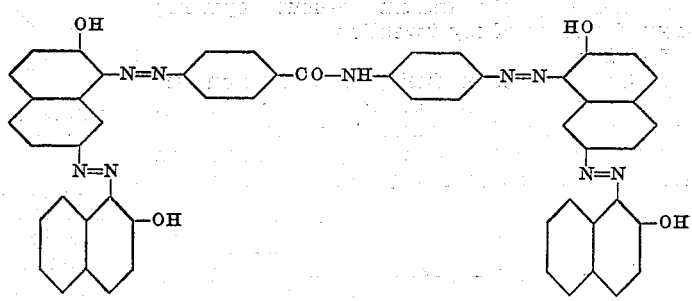

By substituting for the parent disazo dyestuff of this example, the corresponding dyestuffs obtained by coupling 1 mol of tetrazotized N-(p'-aminobenzoyl)-p-phenylene diamine with 2 mols respectively of 4-hydroxy-7-naphthyl sulfamic acid and 4-hydroxy-6-naphthyl sulfamic acid, and applying the resulting dyestuffs to cotton cloth in the same manner as described above, red and violet shades were respectively produced. Upon treatment of the dyed fiber with a diazotizing solution of nitrous acid containing only a slight excess of strong mineral acid, and developing with β-naphthol in aqueous alkaline solution, brownish red and violet were respectively produced possessing good fastness to washing.

As distinguished from the polyazo compounds of the foregoing examples, compounds similarly prepared by coupling tetrazotized benzidine, dianisidine or N-aminobenzoyl phenylene diamines with α-naphthylamine sulfamic acids such as 2-hydroxy-5- or 8-naphthyl sulfamic acid or α-naphthylamine sulfamic acid itself, could not be satisfactorily diazotized on the fiber with aqueous nitrous acid except when a substantial excess of strong mineral acid, e. g., hydrochloric acid, was present.

In the processes illustrated in the foregoing examples, other polyazo compounds corresponding to the general formula given above can be employed, derived, for example, by coupling tetrazotized benzidene, tolidine, p,p'-diaminodiphenylurea, p,p'-diaminoazoxybenzene, p,p'-diaminodiphenyl-dimethyl-methane, and N-(p'-aminobenzoyl)-p- or m-phenylene diamine, with 2 molecular equivalents of 2- or 4-hydroxy 6- or 7-naphthyl sulfamic acids in alkaline solution.

Other azo coupling components suitable for development on the fiber include 1,3,5-phenyl methyl pyrazolone applied in aqueous alkaline solution, and m-toluylene diamine in aqueous acetic acid solution.

It is to be understood that the free hydroxyl groups in the dyes may be converted to alkoxy groups by treatment of the dye with an alkylating agent, e. g., dimethyl sulfate under alkaline conditions. This treatment is particularly important in those instances in which the hydroxyl groups are in the 4-position since it is known that methylation reduces alkali sensitivity.

Other variations and modifications which will be obvious to those skilled in the art can be made in the process of this invention and the materials employed therein without departing from the scope of my invention.

I claim:

1. A process for producing colorations on cellulosic fiber of outstanding fastness to washing, which comprises dyeing said fiber with an aqueous solution of a polyazo compound having in free acid form the following general formula:

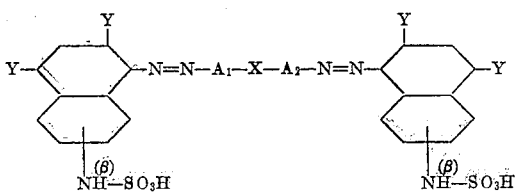

wherein $A_1$ and $A_2$ represent phenylene radicals; X is a member of the class consisting of a single valence bond and an acyclic atomic bridge interconnecting the radicals $A_1$ and $A_2$; one Y in each of the naphthalene nuclei is a member of the class consisting of hydroxy and alkoxy groups and the other Y is hydrogen; and the sulfamic acid groups occupy a beta position in the ring of the naphthalene nucleus opposite the Y-substituted ring, said compound containing no acidic water-solubilizing groups other than the sulfamic acid groups; treating the dyed material with an aqueous nitrous acid solution to convert said sulfamic acid groups on the fiber to diazo groups, and developing by treatment with an aqueous solution of an azo coupling component containing no acidic water-solubilizing groups.

2. A process for producing colorations on cellulosic fiber of outstanding fastness to washing, which comprises dyeing said fiber with an aqueous solution of a polyazo compound having in free acid form the following general formula:

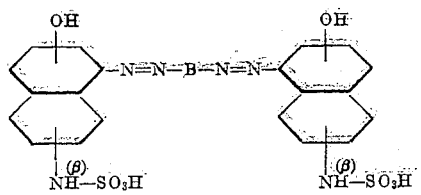

wherein B represents a p,p'-diphenyl radical, wherein the hydroxyl groups occupy one of the positions of the naphthalene nucleus ortho and para to the α-azo group, and wherein the sulfamic acid groups occupy a beta position in the ring of the naphthalene nucleus opposite the OH-substituted ring, said compound containing no acidic water-solubilizing groups other than the sulfamic acid groups; treating the dyed material with an aqueous nitrous acid solution to convert said sulfamic acid groups on the fiber to diazo groups, and developing by treatment with an aqueous solution of an azo coupling component containing no acidic water-solubilizing groups.

3. A process for producing colorations on cellulosic fiber of outstanding fastness to washing, which comprises dyeing said fiber with an aqueous solution of a polyazo compound having in free acid form the following general formula:

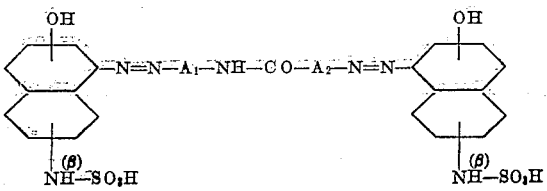

wherein $A_1$ and $A_2$ represent phenylene radicals; wherein the hydroxyl groups occupy one of the positions of the naphthalene nucleus ortho and para to the α-azo group, and wherein the sulfamic acid groups occupy a beta position in the ring of the naphthalene nucleus opposite the OH-substituted ring, said compound containing no acidic water-solubilizing groups other than the sulfamic acid groups; treating the dyed material with an aqueous nitrous acid solution to convert said sulfamic acid groups on the fiber to diazo groups, and developing by treatment with an aqueous solution of an azo coupling component containing no acidic water-solubilizing groups.

4. A process for producing colorations on cellulosic fiber of outstanding fastness to washing, which comprises dyeing said fiber with an aqueous solution of a polyazo compound having in free acid form the following general formula:

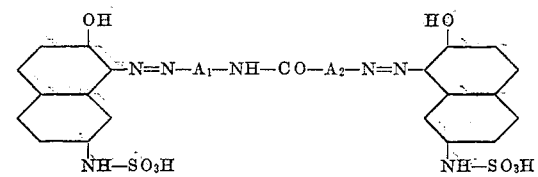

wherein $A_1$ and $A_2$ represent phenylene radicals, said compound containing no acidic water-solubilizing groups other than the sulfamic acid groups; treating the dyed material with an aqueous nitrous acid solution to convert said sulfamic acid groups on the fiber to diazo groups, and developing by treatment with an aqueous solution of an azo coupling component containing no acidic water-solubilizing groups.

5. A process for producing colorations on cellulosic fiber of outstanding fastness to washing, which comprises dyeing said fiber with an aqueous solution of a polyazo compound having in free acid form the following general formula:

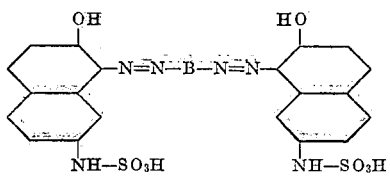

wherein B represents a p,p'-diphenyl radical, said compound containing no acidic water-solubilizing groups other than the sulfamic acid groups, treating the dyed material with an aqueous nitrous acid solution to convert said sulfamic acid groups on the fiber to diazo groups, and developing by treatment with an aqueous solution of an azo coupling component containing no acidic water-solubilizing groups.

CHARLES H. STRATTON.

(References on following page)

REFERENCES CITED

The following references are of record in the file of this patent:

UNITED STATES PATENTS

| Number | Name | Date |
|---|---|---|
| 1,183,378 | Heidenseich | May 16, 1916 |
| 1,505,569 | Laska | Aug. 19, 1924 |
| 1,529,739 | Haller | Mar. 17, 1925 |
| 1,737,905 | Zitscher (2) | Dec. 3, 1929 |
| 1,857,230 | Zitscher (1) | May 10, 1932 |
| 2,134,728 | Morschel | Nov. 1, 1938 |
| 2,135,964 | Dahlen | Nov. 8, 1938 |
| 2,249,334 | Sparks | July 15, 1941 |
| 2,267,770 | Glahn | Dec. 30, 1941 |
| 2,283,829 | Suckfull | May 19, 1942 |

FOREIGN PATENTS

| Number | Country | Date |
|---|---|---|
| 216,527 | Great Britain | Mar. 19, 1925 |
| 262,987 | Great Britain | Dec. 23, 1926 |
| 801,094 | France | May 16, 1936 |

Certificate of Correction

Patent No. 2,563,381                                                August 7, 1951

CHARLES H. STRATTON

It is hereby certified that error appears in the printed specification of the above numbered patent requiring correction as follows:

Column 3, lines 49 to 56, for the formula reading

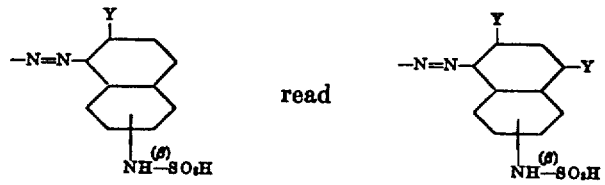

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*